United States Patent

[11] 3,556,142

[72] Inventors Leroy J. Sabin
  Xenia;
  Paul R. Hughes, Englewood, Ohio
[21] Appl. No. 824,068
[22] Filed May 13, 1969
[45] Patented Jan. 19, 1971
[73] Assignee United Aircraft Products, Inc.
  Dayton, Ohio
  a corporation of Ohio

[54] FAN PROTECTION VALVE
  7 Claims, 2 Drawing Figs.
[52] U.S. Cl. .................................................. 137/565,
  137/517, 138/46
[51] Int. Cl. ................................................... F16k 17/30,
  F01b 25/00
[50] Field of Search .......................................... 137/565,
  517, 543; 138/46; 244/(Inquired), 57, 117.1;
  165/(Inquired), 44, 121, 122, 126;
  230/(Inquired), 114I, 114G, 115

[56] References Cited
UNITED STATES PATENTS
3,255,963 6/1966 Gorchev et al. ............. 138/46X
3,406,904 10/1968 Muzzi et al. ................. 165/126X Primary Examiner—William R. Cline
Attorney—J. E. Beringer ABSTRACT: Apparatus in a heat transfer system or the like. The open end of a duct normally supplied with air at high flow rates is controlled by a valve biased to a position of minimum restriction. Under conditions of high airflows, a created pressure difference moves the valve toward a position of maximum restriction. A fan, located in the duct to induce air flow in the absence of the normal supply, is protected thereby from damage caused by excessive windmilling.

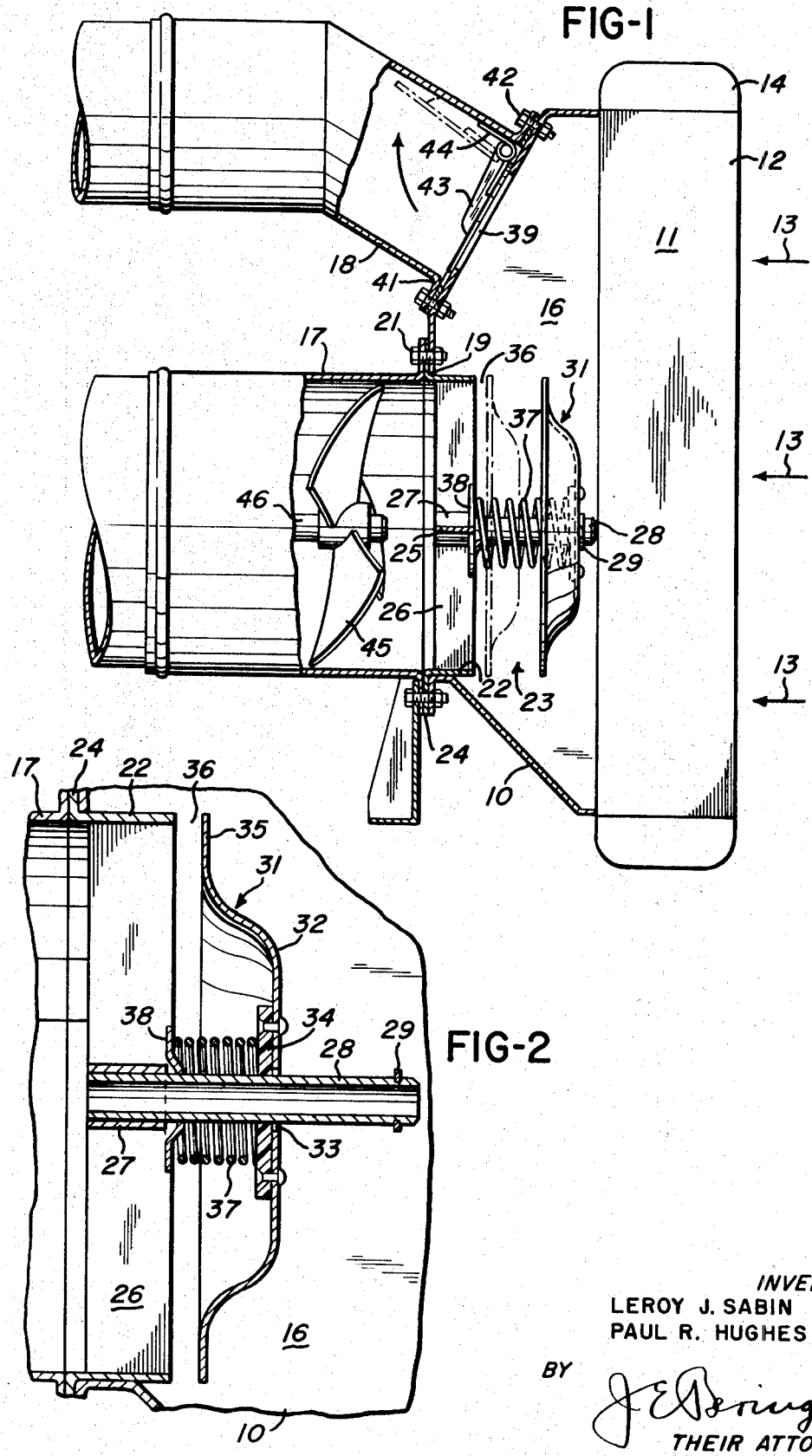

FAN PROTECTION VALVE

Although not so limited, this invention has special reference to heat transfer systems, and particularly to means for protecting a fan element is in such a system.

A system in accordance with a preferred aspect of the invention places a heat exchanger in the path of ram air in an aircraft. The ram air acts as a coolant and is carried off or away from the heat exchanger by a duct in which is a normally inactive motor-operated fan. Should it be desired to begin cooling before the aircraft is in flight, or to continue cooling after the aircraft has landed, the fan is set in operation. It produces an induced flow of air, acting as a coolant in the absence of ram air. In flight, the fan is inactive and is subject to windmilling under the influence of ram air. Since the ram air may be supplied at high flows windmilling may become excessive and result in fan damage.

It is an object of the this invention to reduce the likelihood of fan damage by decreasing the flow rates through the duct during in flight operation. In carrying out such object there is incorporated in the apparatus a throttling or like valve at the entrance end of the duct. Under the influence of ram air, the throttling valve assumes a position of maximum restriction relative to the entrance end of the duct. In the absence of pressure differences created by ram air flow, the valve is biased to and assumes a position of minimum restriction. Accordingly, ram air flow is controlled and restricted to amounts substantially reducing the likelihood of excessive fan windmilling. At the same time however, the open area of the entrance end of the duct is amplified or restored to normal during fan operation to make possible adequate air flows without overburdening the fan and motor.

Other objects and structural details of the invention will appear from the following description, when read in connection with the accompanying drawings, wherein:

FIG. 1 is a detail view, partly broken away, and in side elevation, of apparatus in accordance with the illustrated embodiment of the invention, valve means in accordance with the invention being shown in full lines in a position of minimum restriction; and FIG. 2 is a fragmentary view in longitudinal section, showing the valve in a position of maximum restriction.

Referring to the drawing, apparatus in accordance with illustrated embodiment of the invention provides a manifold 10 secured peripherally to a heat exchanger 11. A frontal surface 12 of the heat exchanger 11 is presented to an in flowing current of ram air as indicated by arrows 13 passing through the heat exchanger. The ram air acts as a coolant with respect to a second fluid circulated through the heat exchanger by means including end manifolds 14 and 15.

Having passed through the heat exchanger 11, the ram air is established in a chamber 16 defined by the manifold 10. There it has access, as will hereinafter more clearly appear to communicating ducts 17 and 18. The manifold 10 has a central opening 19. The duct 17 has an open flanged end aligning with opening 19 and secured to manifold 10 by bolts 21. Received in the opening 19 and projecting in into manifold chamber 16 is a cylindrical part 22 of a valve assembly 23. The part 22 has a flange 24 on one end received between the flanged end of duct 17 and manifold 10 and clamped therewith by bolts 21. Vertically and horizontally intersecting ribs 25 and 36 terminate at the center of part 22 in a bearing position 27. A tube 28 has one end thrust into the bearing 27 and is welded or otherwise secured thereto. The tube 28 projects axially through and beyond part 22 into the chamber 16. A limit ring 29 is installed in its periphery near the outer end.

A poppet type valve 31 slips over tube 28 to be axially reciprocable thereon. A central recessed portion 32 of the valve has an opening 33 through which tube 28 is recieved. On the recesses recessed inner face of portion 32 a nylon bearing member 34 is secured to the valve and achieves a close fitting sliding contact with the exterior of tube 28. Radially outwardly of portion 32, the valve 31 is formed with a radial flange like portion 35 substantially coextensive in diameter with the part 22 and adapted to approach a seat thereon. The arrangement is one to define between flangelike valve portion 35 and part 22 annular open area 36 through which air in chamber 16 has access to the duct 17. A compression spring 37 adjusts valve 31 outwardly to a position limiting against ring 29, in which position the valve exerts minimum restriction upon air flow through area 36. Substantially fully compressed, the valve 31 occupies a position adjacent part 22 reducing a minimum the open space provided by annular area 36.

The duct 18 extends in generally parallel relation to duct 17. It communicated in with chamber 16 through an opening 39 in manifold 10. The opening 39 is overlaid by a valve plate 41 clamped between a flanged end of duct 18 and the manifold 10 by bolts 42. The plate 41 has an opening registering with opening 39 and is controlled by a flapper-type valve 43 urged to a closed position by a torsion spring 44. Normally occupying a closed position as shown in full lines in FIG. 1, the valve 43 is movable to an open position as shown in dotted lines by a pressure difference between chamber 16 and duct 18 sufficient to overcome spring 44.

The duct provides a substantially integral par there part p thereof a motor fan combination including a fan 45 and rotary shaft 46. The motor-fan combination normally is inactive and shaft 46 and fan 45 are free to rotate in a windmill fashion as ram air is directed to and flows through duct 17. The valve assembly 23 and in particular valve 31 thereof exercises of the fan 45 and thereby reducing the likelihood of damage.

When the aircraft in on the ground valve 31 is under control of spring 37 and therefore assumes a position as shown in full lines in FIG. 1, limiting against ring 29. The valve accordingly is in a position of minimum airflow restriction. Should it be desired to operate the cooling system under these conditions, fan 45 is set in operation. Ambient air thereby is drawn through heat exchanger 11 into manifold chamber 16 and flows through annular passage 36 into duct 17. Air flows generated by the fan 45 are small in relation to ram air flows so that passage 36 remains wide open, allowing fan 45 to work to maximum efficiency. Valve 31 will remain seated on ring 29 or may move slightly therefrom under pressure of the inflowing air induced air currents. Under inflight conditions the fan 45 no longer is in a powered rotation but is susceptible of free rotation and if excessive airflows are permitted to pass through the duct 17 the involved pressures and windmilling action of the fan may cause breakage, undue wear and the like. The ram airflows enter manifold chamber 16 and the pressure difference between the manifold chamber and the interior of duct 17 is applied in a manner to urge valve 31 toward a position of greater restriction, compressing spring 37. Such closing motion of the valve may be continued until it reaches a position substantially as shown in dotted lines in FIG. 1 and full line in FIG. 2 wherein the open area defined by annular passage 36 has been substantially reduced. Airflows into the duct 17 accordingly are held to values considered not potentially destructive of the fan 45. Excess ram airflows force open valve 43 and at are led away from manifold chamber 16 by way of duct 18.

A preferred embodiment of the invention has been illustrated but it will be evident that the invention has other applications, and, that structural modifications thereof within the scope of the claims to follow are possible and contemplated.

I claim:

1. Apparatus interposed in an current of high flow including a duct having an entrance end admitting said air current, a normally inactive fan in said duct selectively operable in the absence of said high flow air current to create an induced lower flow air current into said entrance end of said duct, and flow restriction means positioned at said entrance end of said duct for protecting said fan from windmilling damage during high air flows by automatically restricting airflow through said duct in response to said higher airflows while fully accommodating said induced airflows.

2. Apparatus according to claim 1, wherein said flow restricting means includes a poppet type valve controlling airflow into the entrance end of said duct and responding to an air pressure difference to move toward a position of maximum flow restriction, said valve being biased to a position of minimum restriction.

3. Apparatus according to claim 2, characterized by spring means means means acting as a biasing agent upon said valve and constructed by said high flow air current and to be relatively superior ro pressure differences created by the lower flow air current.

4. Apparatus according to claim 1, wherein said flow restricting means is a valve controlling airflow into the entrance end of said duct and settable to positions of minimum and maximum restriction, said valve responding to the high flows of the first mentioned air current to move toward a position of minimum restriction, said biasing means being relatively unyielding to the lower flows of the inducted air current.

5. Apparatus according to claim 1, wherein said flow restricting means is a valve adapted to move toward a seat on the entrance end of said duct to reduce the presented flow area through which air may enter said duct and movable in the opposite direction to increase such flow area, said valve being mounted to be responsive to high airflows to reduce the flow area and being biased in the opposite direction.

6. Apparatus according to claim 5, wherein said entrance end of said duct is formed as an open end thereof in the axis of said fan, said valve being a poppet type valve mounted in said open end of said duct to reciprocate relatively thereto, further characterized by a compression spring based to urge said valve outwardly away from the said open end of said duct.

7. Apparatus according to claim 5, characterized by a manifold receiving the airflow and into which said entrance end of said ducts opens, said manifold having a relief valve controlled outlet in bypassing relation to said duct to accommodate air flows supplied to the entrance end of said duct in excess of flows permitted by said valve.

UNITED STATES PATENT OFFICE

CERTIFICATE OF CORRECTION

Patent No. 3,556,142          Dated: January 19, 197

Leroy J. Sabin and Paul R. Hughes

It is certified that error appears in the above-identified patent and that said Letters Patent are hereby corrected as shown below:

Column 1, line 19, "in flight" should be -- in-flight line 42, after "with" insert -- the --;
line 45, "in flowing" should be -- in-flowir
line 70, cancel "recesses";
line 74, "flange like" should be -- flange-like --;

Column 2, line 1, "flangelike" should be -- flange-like --;

line 2, after "22" insert -- an --;
line 10, "communicated in" should be -- communicates --;
line 20, "a substantially integral par there part p" should be -- as a substantially integral part --;
line 25, after "exercises" insert -- an automatic control function avoiding excessive windmilling
line 55, "at" should be deleted;

Claim 1, line 1, after "an" insert -- air --;
last line, after "induced" insert -- lower --

Claim 3, line 2, "means means" should be deleted;
line 3, after "constructed" insert -- to be overcome by pressure differences created --;

Claim 4, line 6, after "of" insert -- maximum restriction, further characterized by biasing means urging said valve toward a position of --;

Claim 7, line 3, "ducts" should be -- duct --;

Column 2, line 20, after "duct" insert -- 17 --.

Signed and sealed this 25th day of May 1971.

(SEAL)
Attest:

EDWARD M. FLETCHER, JR.          WILLIAM E. SCHUYLEI
Attesting Officer                Commissioner of Pat